(12) United States Patent
Mitelman

(10) Patent No.: US 11,544,374 B2
(45) Date of Patent: Jan. 3, 2023

(54) MACHINE LEARNING-BASED SECURITY THREAT INVESTIGATION GUIDANCE

(71) Applicant: ENTIT SOFTWARE LLC, Sanford, NC (US)

(72) Inventor: Tamir Mitelman, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 568 days.

(21) Appl. No.: 15/973,189

(22) Filed: May 7, 2018

(65) Prior Publication Data
US 2019/0340353 A1 Nov. 7, 2019

(51) Int. Cl.
*G06F 21/55* (2013.01)
*G06N 20/00* (2019.01)

(52) U.S. Cl.
CPC ........... *G06F 21/552* (2013.01); *G06N 20/00* (2019.01); *G06F 2221/034* (2013.01)

(58) Field of Classification Search
CPC .............................. G06F 21/552; G06N 20/00
See application file for complete search history.

(56) References Cited

U.S. PATENT DOCUMENTS

| | | | |
|---|---|---|---|
| 8,055,598 B1* | 11/2011 | Freeman | G06F 17/11 706/45 |
| 9,552,412 B1* | 1/2017 | Lowe | G06F 16/93 |
| 9,690,938 B1 | 6/2017 | Saxe et al. | |
| 10,198,511 B1* | 2/2019 | Gupta | G06F 9/453 |
| 10,320,633 B1* | 6/2019 | Wong | H04L 67/02 |
| 10,535,018 B1* | 1/2020 | Kenthapadi | G06N 5/003 |
| 10,581,886 B1* | 3/2020 | Sharifi Mehr | H04L 63/1425 |
| 10,698,571 B2* | 6/2020 | Gulwani | G06F 3/0482 |
| 10,733,037 B2* | 8/2020 | Ramakrishna | G06F 11/0793 |
| 2007/0073743 A1* | 3/2007 | Bammi | G06Q 10/00 |
| 2008/0307490 A1* | 12/2008 | Van Wyk | G06Q 10/06 726/1 |
| 2008/0313119 A1* | 12/2008 | Leskovec | G06F 16/951 706/46 |
| 2011/0004831 A1* | 1/2011 | Steinberg | G06F 3/04842 715/753 |
| 2012/0317644 A1* | 12/2012 | Kumar | G06F 21/566 726/24 |
| 2013/0060769 A1* | 3/2013 | Pereg | G06F 16/3338 707/728 |

(Continued)

OTHER PUBLICATIONS

NPL Search (Google Scholar) (Year: 2021).*

(Continued)

*Primary Examiner* — Mohammed Waliullah
(74) *Attorney, Agent, or Firm* — Sheridan Ross P.C.

(57) ABSTRACT

A technique includes accessing data representing a state of a given investigation of a potential security threat to a computer system by a security analyst. The state includes a result of a current investigative step of the investigation, and the analyst conducting the investigation uses an investigation graphical user interface (GUI). The technique includes applying machine learning that is trained on observed investigations to determine a recommendation to guide the analyst in a next investigative step for the given investigation. The technique includes communicating the recommendation through an output provided to the investigation GUI.

18 Claims, 13 Drawing Sheets

(56) References Cited

U.S. PATENT DOCUMENTS

| | | | |
|---|---|---|---|
| 2013/0066889 A1* | 3/2013 | Rodriguez | G06F 16/951 707/754 |
| 2013/0097140 A1* | 4/2013 | Scheel | G06Q 50/01 707/706 |
| 2014/0358825 A1* | 12/2014 | Phillipps | G06Q 30/0241 706/11 |
| 2014/0358828 A1* | 12/2014 | Phillipps | G06N 20/00 706/12 |
| 2016/0147889 A1* | 5/2016 | Lakshmanan | G06F 16/9038 707/731 |
| 2016/0253672 A1* | 9/2016 | Hunter | G06Q 20/4016 705/39 |
| 2016/0330219 A1 | 11/2016 | Hasan | |
| 2016/0371618 A1* | 12/2016 | Leidner | G06N 5/025 |
| 2017/0060868 A1* | 3/2017 | Rais Ghasem | G06F 16/243 |
| 2017/0063899 A1* | 3/2017 | Muddu | G06F 3/0482 |
| 2017/0063912 A1* | 3/2017 | Muddu | H04L 43/045 |
| 2017/0068816 A1* | 3/2017 | Cavazos | G06F 21/562 |
| 2017/0124487 A1* | 5/2017 | Szeto | G06F 11/1448 |
| 2017/0208151 A1* | 7/2017 | Gil | H04L 67/1097 |
| 2017/0237752 A1 | 8/2017 | Ganguly et al. | |
| 2017/0262633 A1* | 9/2017 | Miserendino | G06F 21/564 |
| 2017/0337199 A1* | 11/2017 | Kogan | G06F 40/169 |
| 2017/0351819 A1* | 12/2017 | Yamamoto | G06F 19/00 |
| 2017/0351951 A1* | 12/2017 | Santos | G06F 16/9535 |
| 2017/0371954 A1* | 12/2017 | Kikuchi | G06F 16/3322 |
| 2018/0007084 A1 | 1/2018 | Reddy et al. | |
| 2018/0088753 A1* | 3/2018 | Viegas | G06F 40/216 |
| 2018/0089269 A1* | 3/2018 | Pal | G06F 16/24554 |
| 2018/0121808 A1* | 5/2018 | Ramakrishna | G06F 11/0793 |
| 2018/0124098 A1* | 5/2018 | Carver | H04L 63/1433 |
| 2018/0336353 A1* | 11/2018 | Manadhata | G06F 16/9024 |
| 2018/0367549 A1* | 12/2018 | Jang | H04L 63/1433 |
| 2018/0367561 A1* | 12/2018 | Givental | H04L 63/1408 |
| 2019/0057335 A1* | 2/2019 | Dyer | G10L 15/18 |
| 2019/0130039 A1* | 5/2019 | Fang | G06F 16/90332 |
| 2019/0204992 A1* | 7/2019 | Bowden | G06F 3/04842 |
| 2019/0205771 A1* | 7/2019 | Lin | G06N 20/00 |
| 2019/0213475 A1* | 7/2019 | Erlandson | G06N 3/08 |
| 2019/0258963 A1* | 8/2019 | Guo | G06N 20/00 |
| 2019/0260782 A1* | 8/2019 | Humphrey | H04L 63/1441 |
| 2019/0310977 A1* | 10/2019 | Pal | G06F 16/2228 |
| 2019/0340353 A1* | 11/2019 | Mitelman | G06N 20/00 |
| 2020/0065342 A1* | 2/2020 | Panuganty | G06F 16/632 |
| 2020/0084087 A1* | 3/2020 | Sharma | H04L 43/0817 |
| 2020/0097651 A1* | 3/2020 | Mestha | G16H 40/63 |
| 2020/0210647 A1* | 7/2020 | Panuganty | G06F 16/24578 |
| 2020/0401593 A1* | 12/2020 | Panuganty | G06F 9/4881 |

OTHER PUBLICATIONS

Juniper Networks, Inc.; "Automating Cybersecurity"; downloaded on Apr. 30, 2018; https://www.juniper.net/us/en/insights/machine-learning-security/; 6 pp.

Wipro Limited, Cybersecurity & Risk Services; "Demystifying Machine Learning for Threat Detection"; http://www.wipro.com/documents/Demystifying-machine-learning-for-threat-detection.pdf; downloaded on Apr. 30, 2018; 6 pp.

TechBeacon; "Introduction to Cybersecurity Threat Detection Analytics"; https://learn.techbeacon.com/units/introduction-cyber-security-threat-detection-analytics; downloaded on Apr. 30, 2018; 26 pp.

Paquette, Mike; "Using Machine Learning and Elasticsearch for Security Analytics: A Deep Dive"; https://www.elastic.co/blog/using-machine-learning-and-elasticsearch-for-security-analytics-deep-dive; downloaded on Apr. 30, 2018; May 17, 2017; 13 pp.

* cited by examiner

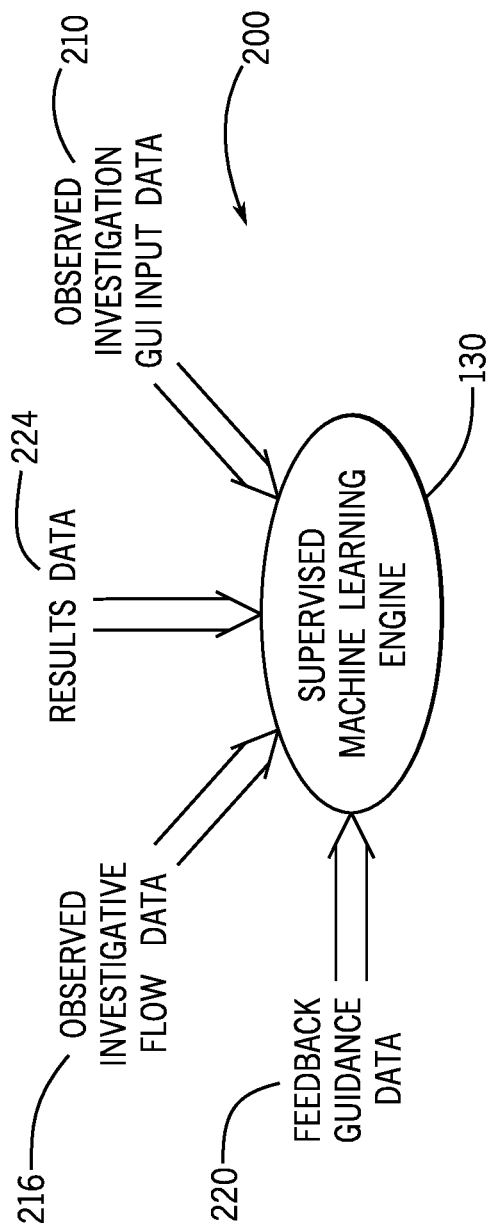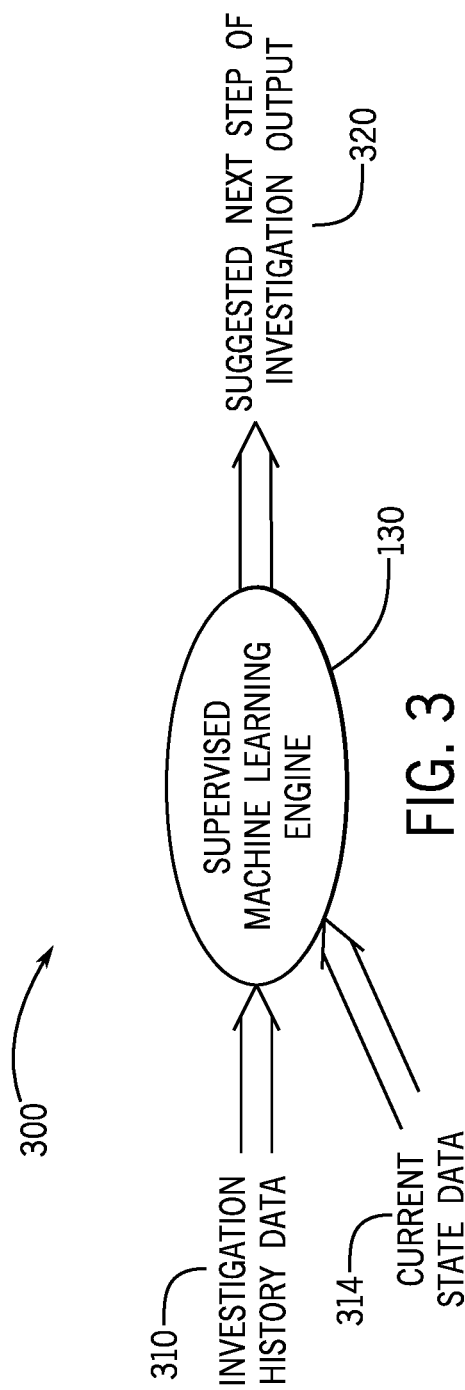

MACHINE LEARNING-BASED SECURITY THREAT INVESTIGATION GUIDANCE

BACKGROUND

An enterprise may have a staff of human analysts (analysts of a security operations center (SOC), for example) that investigate events that occur in the enterprise's computer system for purposes of identifying and addressing security threats to the system. For example, the analysts may investigate activity associated with events that trigger security alerts for purposes of assessing whether the alerts correspond to actual security threats to the computer system; and for identified security threats, the analysts may identify areas of concern (host computers, user accounts, and so forth) and determine the appropriate remedial actions (address blocking, device isolation, quarantining software, and so forth) to be taken.

BRIEF DESCRIPTION OF THE DRAWINGS

FIG. 2 is an illustration of a process to train a supervised machine learning engine to provide security threat investigation guidance according to an example implementation.

FIG. 3 is an illustration of a process to use a supervised machine learning engine to provide recommendations to guide a security threat investigation according to an example implementation.

DETAILED DESCRIPTION

Figure 1:
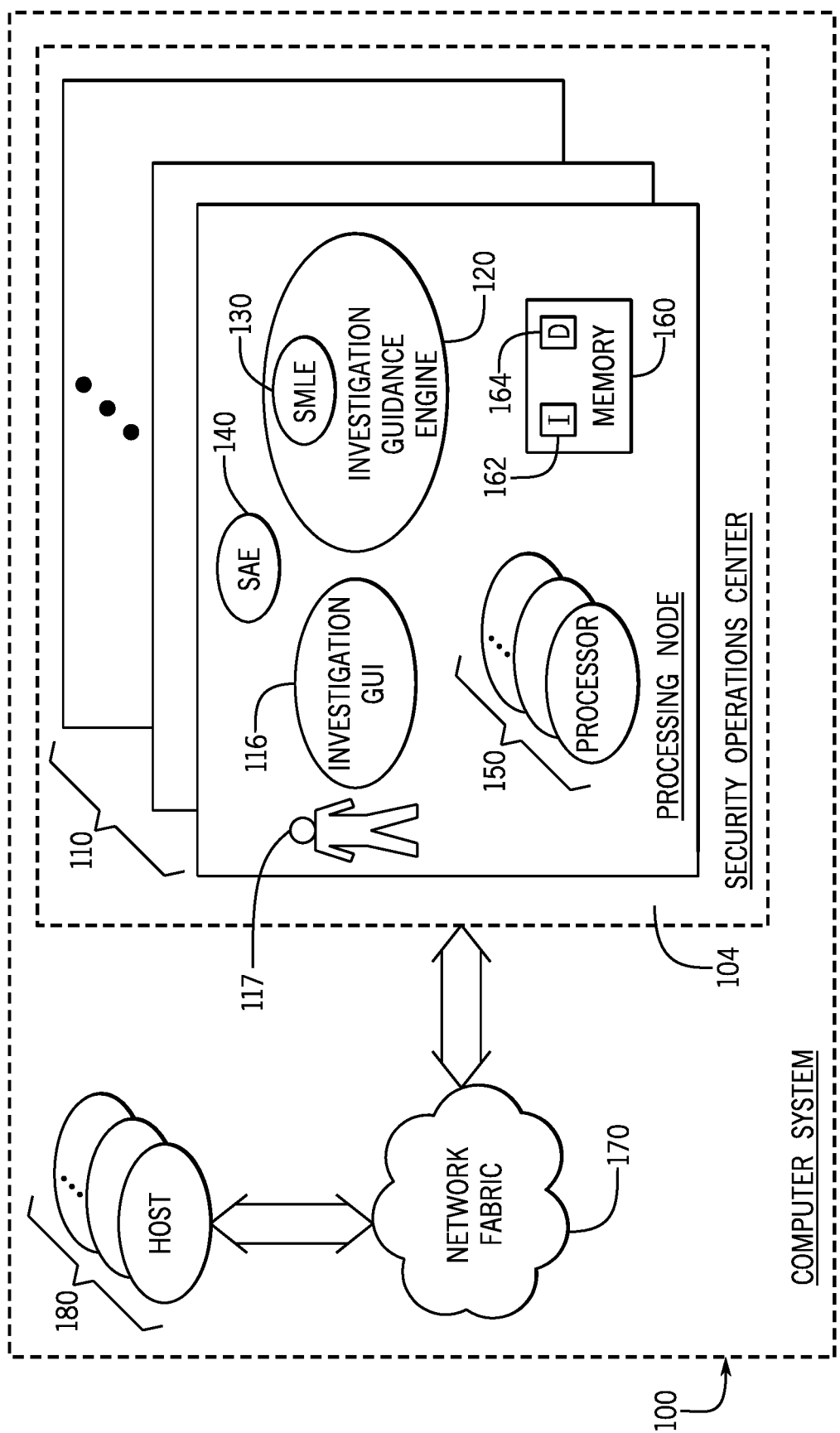
FIG. 1 is a schematic diagram of a computer system according to an example implementation.

Referring to FIG. 1, in accordance with example implementations, a computer system 100, such as a computer system of an enterprise, may include host computers, or "hosts 180," which communicate with each other and communicate with computing entities (not shown) outside of the computer system 100, via network fabric 170. In general, a host 180 may be any computing entity, such as a desktop computer, a server, a client, a tablet computer, a portable computer, a thin client, a rack-mounted computer, a cluster of computers, and so forth.

In general, the computer system 100 may be a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

In general, the network fabric 170 may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

In accordance with example implementations, security alerts arising in the computer system 100 may be monitored and investigated by human analysts 117 (analysts who staff a security operations center 104, as an example). In general, the analysts 117 may use processor-based tools for purposes of conducting investigations (called "security threat investigations") to determine whether security alerts (login failures, communications with known malware sites, anomalous network activity, and so forth) are associated with actual security threats to the computer system 100; and if so, determining the appropriate remedial actions to respond to the threats. As examples, the processor-based tools may be part of a security information and event management (SIEM) system, a security analytics system or a business intelligence system.

As an example, the computer system 100 may include one or multiple processing nodes 110, and one or multiple processing nodes 110 may contain one or multiple security analytics engines 140 that analyze event data for purposes of identifying behavior that is consistent with security threats to the computer system 100 for purposes of generating security alerts. The "event data" refers to data produced by operation of the computer system 100 and may originate with various sources of the computer system 100, such as the hosts 180, components of the network fabric 170, and so forth, as well as external entities (web servers, for example) that communicate with the computer system 100. As examples, the security analytics engines 140 may analyze event data associated with hypertext protocol (HTTP) logs, domain name service (DNS) logs, virtual private network (VPN) logs, netflow traffic, intrusion detection system (IDS) logs, and so forth. In accordance with various implementations, the event data analyzed by the security analytics engine 140 may be derived from hardware devices as well as from software components of the computer system 100.

The processing node 110 may further include one or multiple graphical user interfaces (GUIs), such as investigation GUIs 116, that are used by the analysts 117 to conduct security threat investigations. In general, an "investigation GUI 116" refers to a processor-based tool (i.e., a tool formed at least in part by a hardware processor) that may be used by a human analyst to conduct a security threat investigation. As further described herein, a given investigation may involve multiple investigative steps in which the analyst provides input (via mouse clicks, mouse movements, keyboard strokes, and so forth) to the investigation GUI 116, and the investigation GUI 116 provides an output (visual images on a hardware monitor, audio output, files, and so forth)

As an example, as further described herein, the investigation GUI 116 may include a "search" section in which the analyst may enter input and view output representing a result of that input for purposes of conducting a "search" for a particular investigative step of an investigation. The search section may be used by the analyst 117 to create multiple search instances. Each search instance may be associated with an independent investigation, or multiple search instances may be associated with the same investigation.

As examples, a search instance may be a window (of the GUI 116) in which the analyst may enter a query search for information pertaining to particular devices of the computer system 100, user accounts, and so forth. Moreover, the search instance may allow the analyst to enter parameters that constrain the queries, such as a time range and various filters. Moreover, the search instance may include a visualization region, where charts pertaining to the search are created for purposes of conducting comparative analyses of search results. In general, the creation of a chart may involve the analyst selection of a chart type, axes for the chart, filters and other parameters.

The investigation GUI 116 may contain other and/or different features, in accordance with further example implementations. For example, the investigation GUI 116 may contain a search listing section, which displays identifiers for the different ongoing search instances. In this manner, the analyst may "click" on one of these identifiers for purposes of displaying a current or previous search instance in the foreground.

In general, the investigation of a given security threat may involve a number of inquiries, analyses and decisions that are made by a security analyst 117 in a series of investigative steps. As examples, a given investigative step may include the security analyst making a decision to identify which events and/or which category of data is to be evaluated next; decisions pertaining to selecting the types of charts for analysis of gathered data; decisions pertaining to chart parameters (e.g., the axes, filters, categories, time granularity), and so forth. The investigation may involve a sequence of investigative steps, where each step may involve particular data, devices and/or events, visualization of the gathered information and/or the analysis of the gathered information.

The results that are obtained at one investigative step may influence the inquiries, analyses and decisions that are made at the next investigative step. Therefore, at the onset of a given step in the investigation, the security analyst 117 may decide whether to make adjustments to a query, whether to make adjustments to a time range being considered, whether to make adjustments to the type of data being considered, and so forth.

A given security operations center may investigate a relatively large number (hundreds to possibly thousands) of potential security threats per day. It may be challenging for a relatively novice security analyst 117 (i.e., a lower tier analyst) to make the appropriate inquiries and investigate a security threat alert in a time efficient manner and obtain full coverage for the threat (i.e., make sure nothing has been missed).

In accordance with example implementations, a given processing node 110 may include one or multiple investigation guidance engines 120, which provide recommendations (via output) to security analysts 117 to guide the security threat investigations that are being conducted by the analysts 117. The investigation guidance engine 120 includes a supervised machine learning engine 130, which, in accordance with example implementations, is trained by observing the actions taken by relatively experienced, or higher tier, security analysts when conducting security threat investigations, as well as trained by observing analyst actions taken in response to guidance that is provided by the engine 130. In general, the supervised machine learning engine 130 accesses data representing the current state of a security threat investigation, such as data representing a host internet protocol (IP) under investigation, step(s) already taken by the security analyst 117 in the investigation, query(ies) already submitted in the investigation, comparative analyses that have been performed, data gathered during the investigation, time lines considered, filtering parameters used, field sets considered and so forth. Based on this information, the supervised machine learning engine 130 recommends one or multiple actions to be taken for the next step of the investigation.

As examples, the supervised machine learning engine 130 may provide an output recommending a new query, a certain time line, specific filtering parameters, modifications to an existing query, analyses to use (charts and corresponding chart parameters), and so forth.

The supervised machine learning engine 130 may be trained initially (before making any recommendations) by observing investigations, and moreover, the training of the supervised machine learning engine 130 may continue even as the engine 130 provides guidance. In other words, in accordance with example implementations, the supervised machine learning engine 130 may observe and be trained on the results of each investigation, even investigations in which the engine 130 provides guidance. The supervised machine learning engine 130 may also adapt its guidance based on feedback provided by the analyst 117 to whom guidance is provided by the engine 130. For example, the supervised machine learning engine 130 may train on responses of the security analyst 117 to the engine's recommendations, such as whether the security analyst accepted or rejected certain recommendations; whether the analyst made edits or modifications to the recommendations; and so forth.

In accordance with example implementations, the processing node 110 may include one or multiple physical hardware processors 150, such as one or multiple central processing units (CPUs), one or multiple CPU cores, and so forth. Moreover, the processing node 110 may include a local memory 160. In general, the local memory 160 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 160 may store various data 164 (data representing current states of investigations being conducted by investigation GUI 116 of the processing node 110, a configuration of the supervised machine learning engine 130, input for the supervised machine learning engine 130, output of the supervised machine learning engine 130, recommendations provided by the supervised machine learning engine 130, queries for query parameters recommended by the supervised machine learning engine 130, charts recommended by the supervised machine learning engine 130, chart configuration parameters recommended by the supervised machine learning engine 130, and so forth. The memory 160 may store instructions 162 that, when executed by the processor(s) 150, cause the processor(s) 150 to form one or multiple components of the processing node 110, such as, for example, the investigation guidance engine(s) 120 and the supervised machine learning engine(s) 130.

In accordance with some implementations, each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack.

In accordance with further example implementations, the processing nodes 110 may be associated with one or multiple virtual machines that are hosted by one or multiple physical machines.

In accordance with some implementations, the processor 150 may be a hardware circuit that does not execute machine executable instructions. For example, in accordance with some implementations, the supervised machine learning engine 130 may be formed in whole or in part by an application specific integrated circuit (ASIC), a field programmable gate array (FPGA), and so forth. Thus, many implementations are contemplated, which are within the scope of the appended claims.

FIG. 2 is an illustration 200 of the training of the supervised machine learning engine 130, in accordance with example implementations. In general, the supervised machine learning engine 130 may be trained by observing data 216 representing observed investigative flows and data 210 representing observed investigation GUI input data. The observed investigative flows, in general, include observed inputs and actions that are taken by security analysts 117 (higher tier security analysts, for example) when conducting security threat investigations. In this regard, the supervised machine learning engine 130 may observe the types of threats being investigated and the corresponding filtering parameters, time lines, analyses, queries, query parameters, and so forth.

Part of the observed investigative flow data may include results of the investigations (indicated by results data 224 in FIG. 2). As examples, the results of an investigation may be a determination of whether the threat is real or benign; a decision to take remedial action, such as formatting the computer or blocking communication to an external IP address; and so forth. In accordance with example implementations, there may be several different types or categories of results that are collected and used to train the supervised machine learning engine. In general, the "result" of a given investigative step refers to one or multiple findings or observations, which can be modeled and used to detect anomalous results (results that deviate from an average or other statistical measure, as an example). Accordingly, the supervised machine learning engine 130 may be trained, for example, to recognize that a given set of inputs and investigative steps corresponds to a certain category of security threats, and further be trained to recognize that a certain category of security threat state of investigation corresponds to a likely next investigative step, a next query modification of parameters of an existing query, selection of a particular chart, selection of particular time lines, selection of particular chart parameters, and so forth.

As also depicted in FIG. 2, in accordance with some implementations, the supervised machine learning engine 130 may be trained from data 220 representing feedback to the guidance, or recommendations, that are provided by the supervised machine learning engine 130. As examples, the feedback guidance may include a response to a given security analyst 113 whether a recommendation for a filtering criteria, chart selection, set of chart parameters, time line, and so forth, was accepted or rejected by the security analyst 117; whether a suggested query was edited by the security analyst 117; and so forth. Moreover, the feedback to the guidance may include actions taken by the security analyst 117 other than the actions recommended by the engine 130. Thus, in accordance with some implementations, the data 210, 216 and 224 may be used to train the supervised machine learning engine 130 initially; and all four sets of data 210, 216, 220 and 224 may be used to refine/improve the training of the supervised machine learning engine 130, as the engine 130 is used (and thus, is provided recommended guidance).

In accordance with example implementations, the training of the supervised machine learning engine 130 may take into account the experience of the security analyst that is conducting a given investigation. For example, in accordance with some implementations, the training may cause the machine to (through execution of instructions, for example), for a given investigation, determine a tier that is associated with an analyst that is associated with the given investigation; and weight the training of the supervised machine learning engine 130 from data associated with the given investigation based on the determined tier. As such, in accordance with example implementations, the supervised machine learning engine 130 may apply more weight to training data gathered by observing actions/results that are associated with higher tier (and thus, more experienced) security analysts 117 than training data gathered from observing the actions/results that are associated with lower tier security analysts 117.

In accordance with some implementations, the supervised machine learning engine 130 may employ semi-supervised learning and active learning in the sense that the training set may not include all threats/scenarios/alert types in advance, and the engine 130 may suggest guidance for certain threats or alerts even if the engine 130 has not been trained for these specific threats. For example, the supervised machine learning engine 130 may respond to a query that is not identical to queries that have already been learned by the engine 130, based on similarities between queries for which the engine 130 has been trained and similar functions and analyst interactions. In accordance with example implementations, the supervised training engine 130 keeps monitoring and learning from investigations that are performed by the security analysts 117, so previously "unseen" security threat investigations automatically become part of the training set for the engine 130.

FIG. 3 is an illustration 300 depicting the generation of recommendations by the supervised machine learning engine 130 to guide a security threat investigation, in accordance with example implementations. In general, the supervised machine engine 130 may receive data representing a state of a current investigation. In this manner, as depicted in FIG. 3, the supervised machine learning engine 130 may receive data 310 representing an investigation history for identical or similar security threats and/or objects (investigations referring an IP address, investigations involving malware, investigations involving malware on hosts of the computer system, and so forth). The investigation history may include, for example, one or multiple actions that have already been taken by the security analyst 117. In this manner, such actions may involve considering queries that have been used, parameters of the queries, filtering parameters, timelines, analyses, and so forth.

The supervised machine learning engine 130 may further consider other data representing the state of the investigation, such as data 314 representing the current state of the investigation. For example, the current state may involve the output displayed on the GUI 116; whether the investigation has been focused, or narrowed, or particular events and/or data; whether the investigation has been expanded during the course of the investigation to include additional events and/or data that were not previously involved; and so forth. In response to the data 310 and 314, the supervised machine learning engine 130 may then provide various outputs, such as an output 320 representing the suggested next step of the investigation. The suggested build may be, for example, guidance for a particular type of chart to be considered for a comparative analysis, a time line to be displayed and considered, a particular query, a modification of an existing query, filtering parameters, a particular field set (e.g., devices to target), and so forth.

Figure 4A:
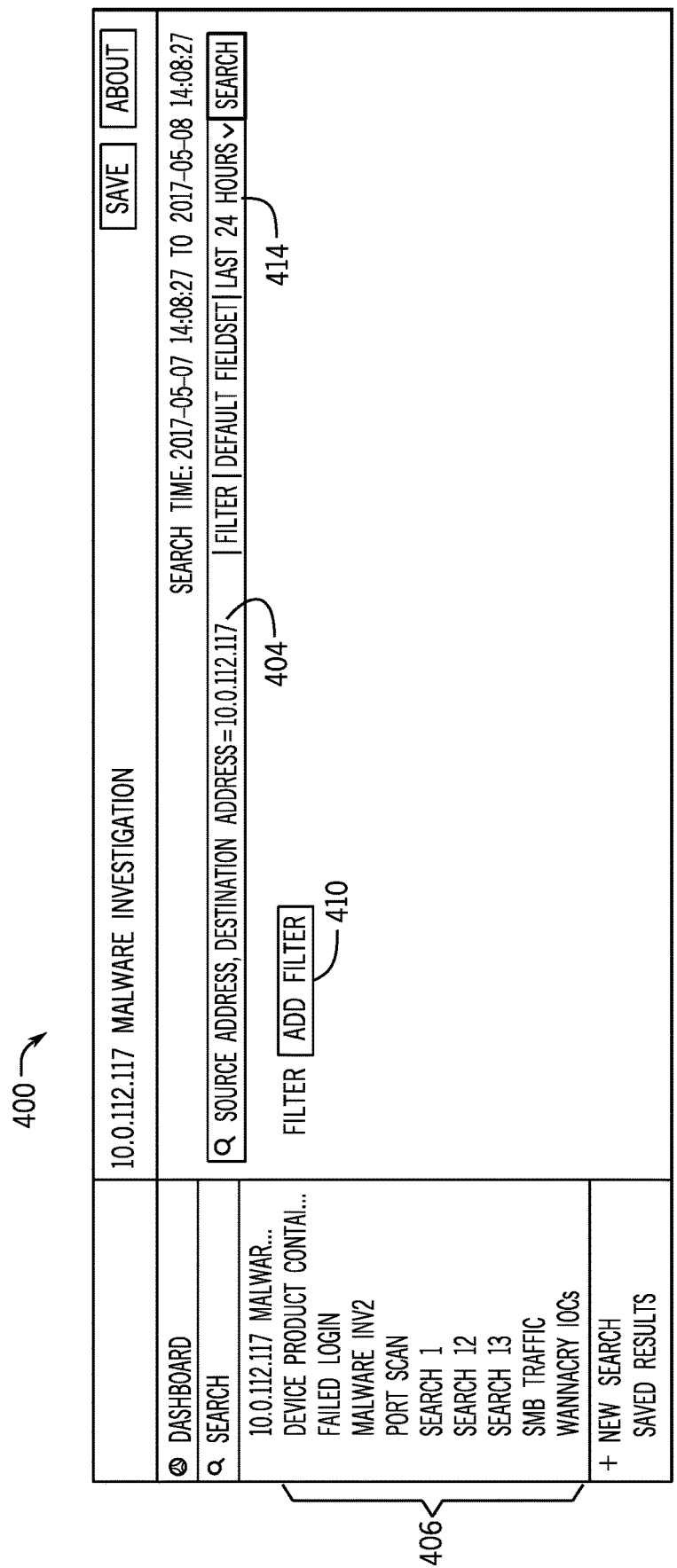
FIGS. 4A, 4B, 4C, 4D, 4E, 4F, 4G, 4H, 4I and 4J are illustrations of states of a graphical user interface (GUI) used by a security analyst at different investigative steps of a security threat investigation according to an example implementation.

As a more specific example, FIGS. 4A-4J depict different states of the investigation GUI 116, illustrating a sequence of steps in an example investigation of unresolved malware being detected and guidance provided by the supervised machine learning engine 130 in this investigation. FIG. 4A depicts an example screenshot 400 of the investigation GUI 116 (FIG. 1) in response to the security analyst being alerted that one of the organization's hosts (a client, a desktop, a laptop computer, a server, and so forth, as examples) may be infected with malware. As depicted in FIG. 4A, the screenshot 400 for this example depicts a source or destination Internet Protocol (IP) address 404 that is associated with the potential malware. Moreover, as depicted in FIG. 4A, the investigation GUI 116 may contain a search section that displays identifiers 406 for other search instances that may or may not be related to the current threat investigation. For this example, the illustrated search instance specifies events occurring within the last twenty-four hours, as depicted at reference numeral 414. Moreover, additional filtering criteria may be added and/or changed by the analyst selecting button 410 (via a mouse click, for example).

The security analyst 117 may begin the investigation by finding all of the related events of the infected host (i.e., the host having the IP address 404) occurring during the last twenty-four hours. At the beginning of the investigation, the security analyst 117 may be presented with many decisions that direct the initial course of the investigation. As examples, these decision may include deciding whether the security analyst 117 searches for outbound events, whether the security analyst 117 searches for inbound events, whether the security analyst 117 searches for both outbound and inbound events, the appropriate time range that is suited for the category of alert, and the parameters of queries to be submitted. Regarding the queries, the security analyst 117 may determine what fields should be included (i.e., the field set) in the results set (i.e., the events retrieved as a result of the query).

Thus, initially, for this example of a security alert representing potential malware infecting a host, the security analyst 117 may take initial steps to guide the investigation. Based on these steps, as well as additional steps conducted during the investigation, the supervised machine learning engine 130 provides guidance, or recommendations, through the investigation GUI 116, as further described below. In general, the questions and/or decisions that the security analyst 117 makes pertaining to how the investigation proceeds using the GUI 116 may include one or more of the following. The security analyst may make a decision as to what events or data are to be evaluated next, the type of chart that best suits this purpose, and the chart parameters (the axes, filters, categories, time granularity, and so forth). Moreover, the security analyst 117 may, during the investigation, decide whether to make adjustments to the query, whether to make adjustments to the time range, whether to make adjustments to the field set, and so forth. The supervised machine learning engine 130 may provide guidance to aid the security analyst 117 in arriving at the proper questions and making the appropriate decisions, as well as other questions and decisions in the investigation.

Figure 4B:
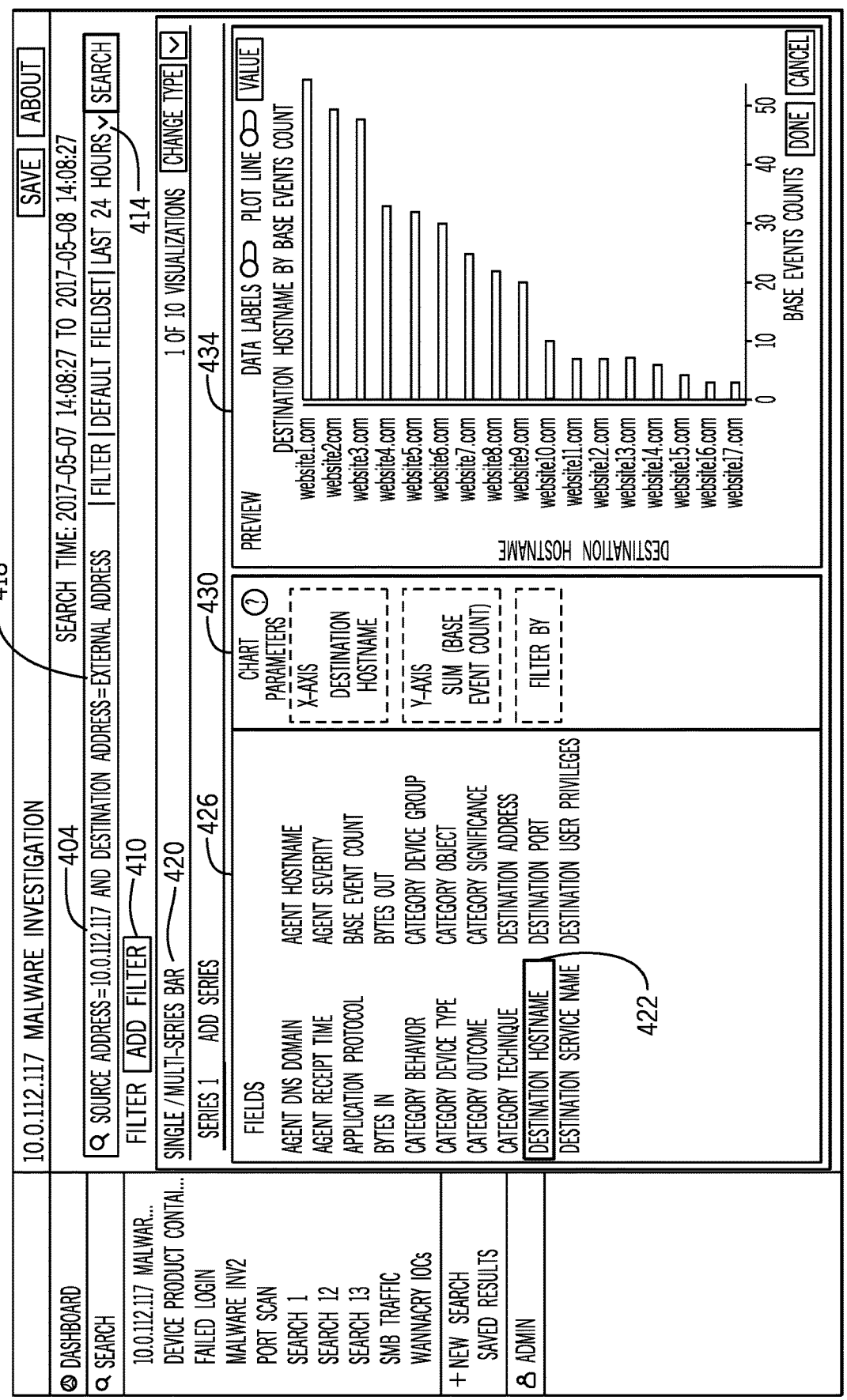

FIG. 4B depicts a screenshot 417 of the investigation GUI 116, illustrating initial steps taken by the security analyst 117 in the investigation of the security alert. Referring to FIG. 4B, here, the security analyst 119 chooses to begin the investigation by examining outbound traffic from the infected host, as indicated as reference numeral 418. Moreover, the security analyst may select a horizontal bar chart (as indicated by the single/multi-series bar window 420), select (as depicted at reference numeral 422) the destination host name 422 and select chart parameters 430 to designate the x axis as being host events and the y axis as being the host events by the destination host name.

As illustrated by a preview window 434 for the horizontal histogram bar chart, nothing may stand out from the visualization provided by the bar chart. The security analyst 117 may then decide to, as examples, end the investigation, search for something else (compromised accounts, virus history, and so forth) or pivot to a different angle for the same data. In accordance with example implementations, the supervised machine learning engine 130 may provide a recommendation for the latter, i.e., the engine 130 may recommend a different chart type and chart definitions, as illustrated in a scatter plot 435 of FIG. 4C.

Figure 4C:
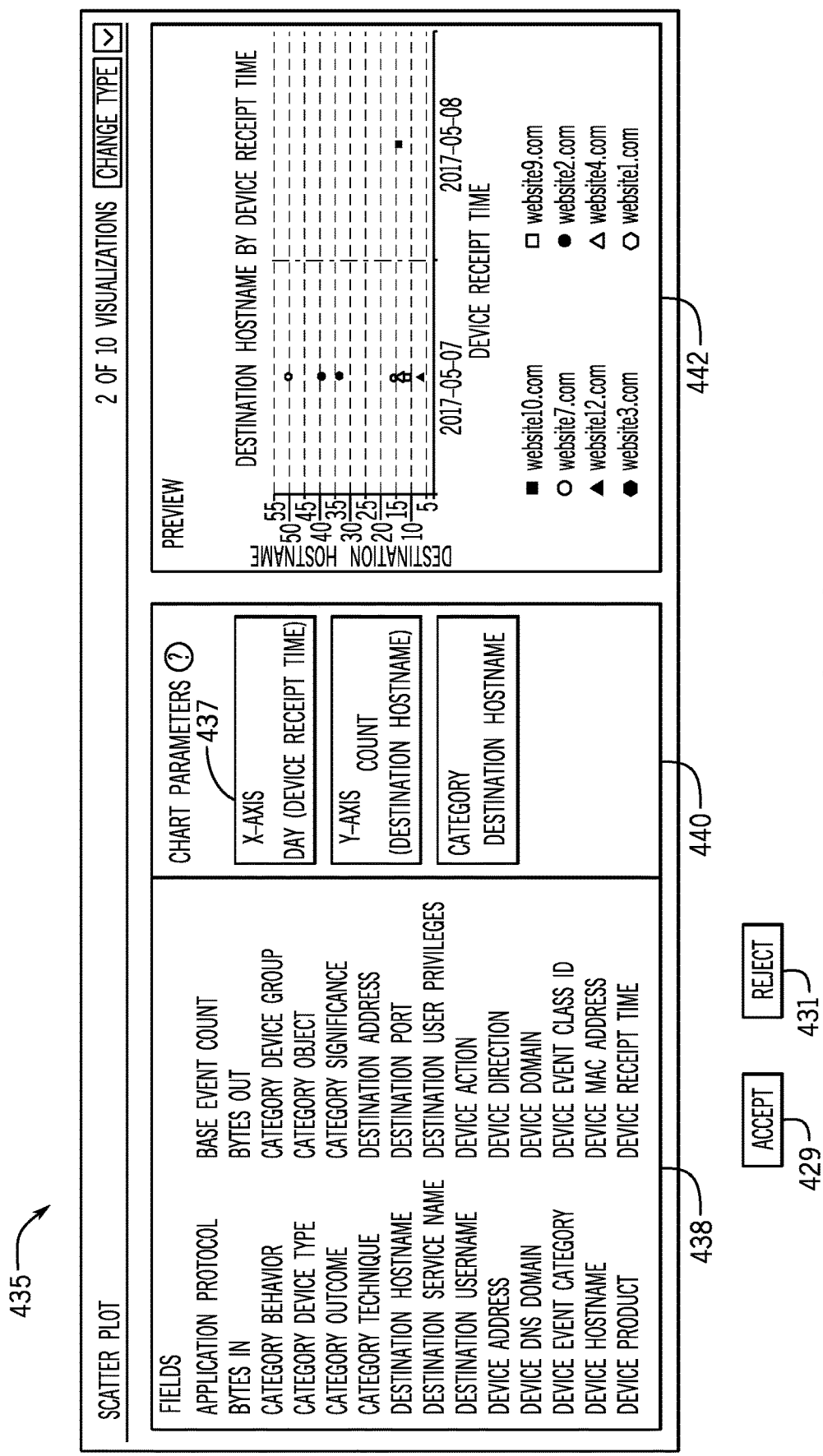

In this manner, referring to FIG. 4C, the supervised machine learning engine 130 may, through the investigation GUI 116, provide an output in the form of a suggested chart 435 (here, a scatter plot. In accordance with some implementations, the supervised machine learning engine 130 may present its output in response to the analyst clicking on a "RECOMMENDATION" button (not shown) for the GUI 116. Moreover, the supervised machine learning engine 130 may present ACCEPT 429 and REJECT 431 buttons, which may be clicked on by the analysist to accept or reject the guidance. The overriding of the provided guidance may be performed by changing a particular part of the recommendations, as further described below. Thus, the analyst 117 has a way to provide input as to the suggestion by the supervised machine learning engine 130, but the analyst 117 may also adjust or edit the suggestion, and accordingly, the engine 130 may learn from these changes as well.

For the example state of the GUI 116 of FIG. 4C, the supervised machine learning engine 130 recommends that the security analyst try a different angle by selecting a scatter chart and looking on the data from a time perspective. In this manner, the supervised machine learning engine 130 may suggest a chart parameter having a "day" granularity, as depicted in reference number 437. As depicted in FIG. 4C, however, the day granularity may not show relevant results. Accordingly, the security analyst may override the suggested chart granularity and select an "hour" granularity, resulting in the selection of a scatter plot 436 (FIG. 4D) having different parameters. It is noted that the overriding of the suggested chart granularity and selection by the security analyst is something that the supervised machine learning engine 130 is expected to suggest. If no anomalies or abnormal behavior is found, which is input that the supervised machine learning engine 130 can observe, in accordance with example implementations, the engine 130 may suggest to change the time granularity to an hour granularity. In other words, the supervised machine learning engine 130 analyzes the results and learns from the results for purposes of understanding why the human analyst 117 changed the time granularity.

Figure 4D:
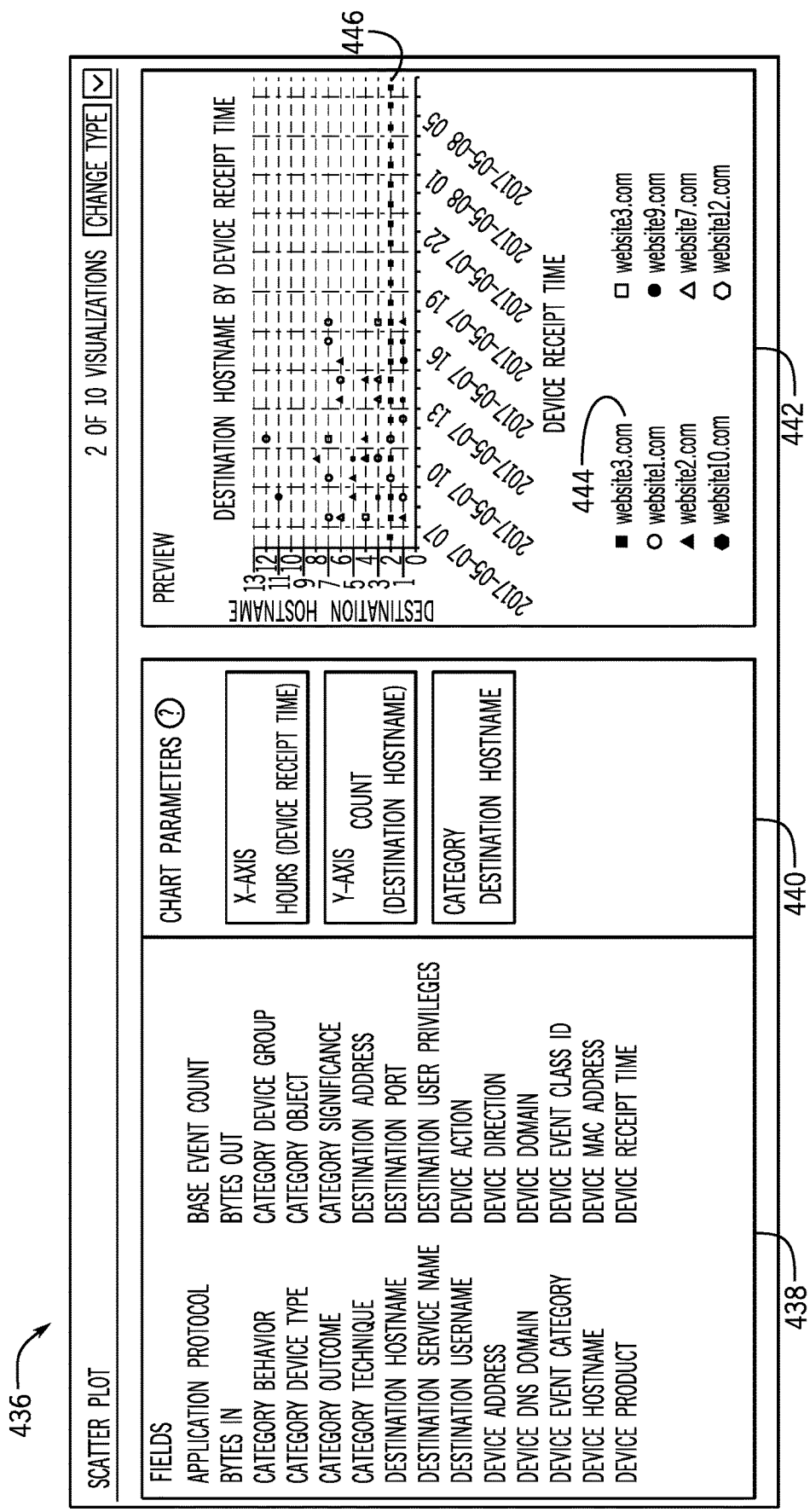

Accordingly, as shown by preview window 442 in FIG. 4D, the scatter plot 442 may reveal a constant outgoing communication to website3.com 444 resulting in a visualization of outgoing communication to website3.com 444 in hours that are abnormal relative to the hours of communications for the other observed domains. In this manner, as depicted at reference numeral 446 of FIG. 4D, the scatter plot 436 may reveal two requests to the website3.com domain 444 every hour. This, in turn, is consistent with a malware beaconing activity, and as such, the security analyst may assume that the host of the organization is indeed infected, and moreover, the security analyst at this point has found the attacker command and control server, i.e., the server associated with the website3.com domain 444.

Figure 4E:
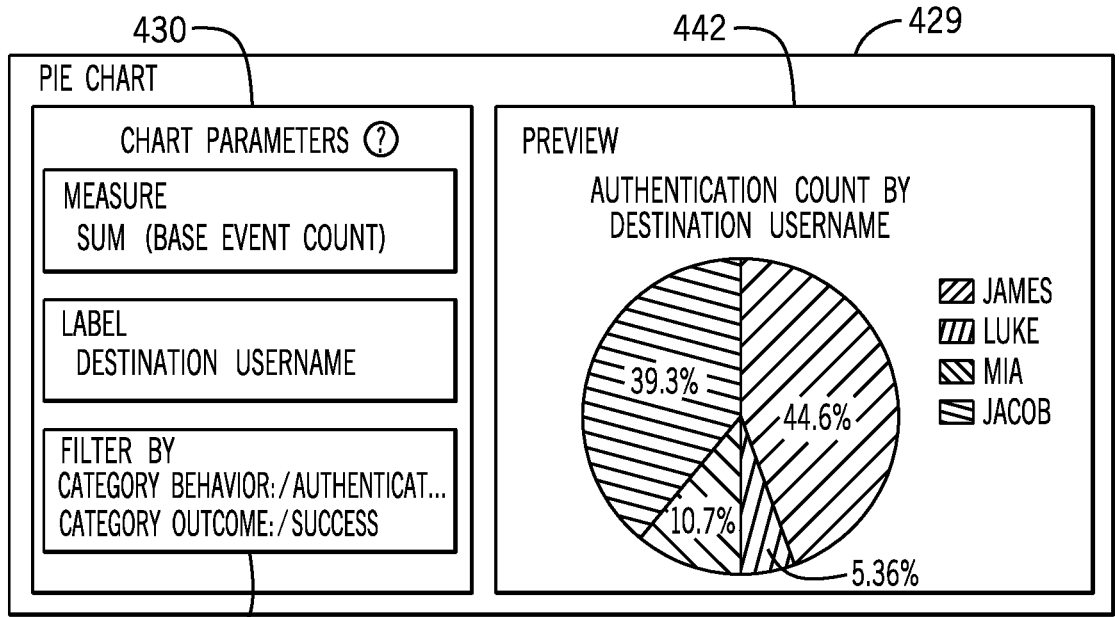

In accordance with example implementations, the supervised machine learning engine 130 may suggest a pie chart 429, as illustrated in FIG. 4E. In this manner, the security analyst may not conclude the investigation at this point, but rather, the supervised machine learning engine 130 recommends investigation of users who are using the infected host. First, the supervised machine learning engine 130 may recommend (not depicted in FIG. 4E) that the security analyst alters the query so that the query selects all inbound, outbound and internal events. Then, as depicted in FIG. 4E, the supervised machine learning engine 130 may recommend a specific type of chart, here the pie chart 429, and the parameters associated with the chart. In particular, as depicted in FIG. 4E, the supervised machine learning engine 130 may, besides defining the access, limit the data to authentication events (reference numeral 450), as the security analyst is recommended to look for which users have successfully logged into the infected host. Therefore, the supervised machine learning training engine 130 suggests that the security analyst use the "filter by" field for that, as the security analyst is searching for the successful authentication events by users.

Figure 4F:
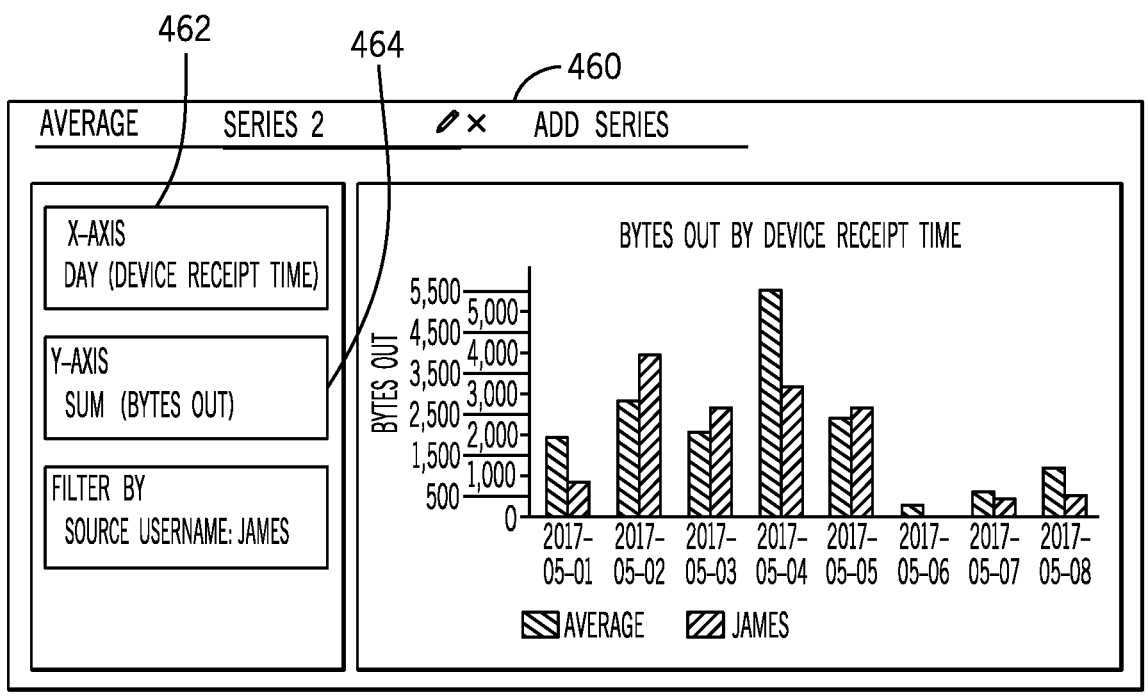
Figure 4G:
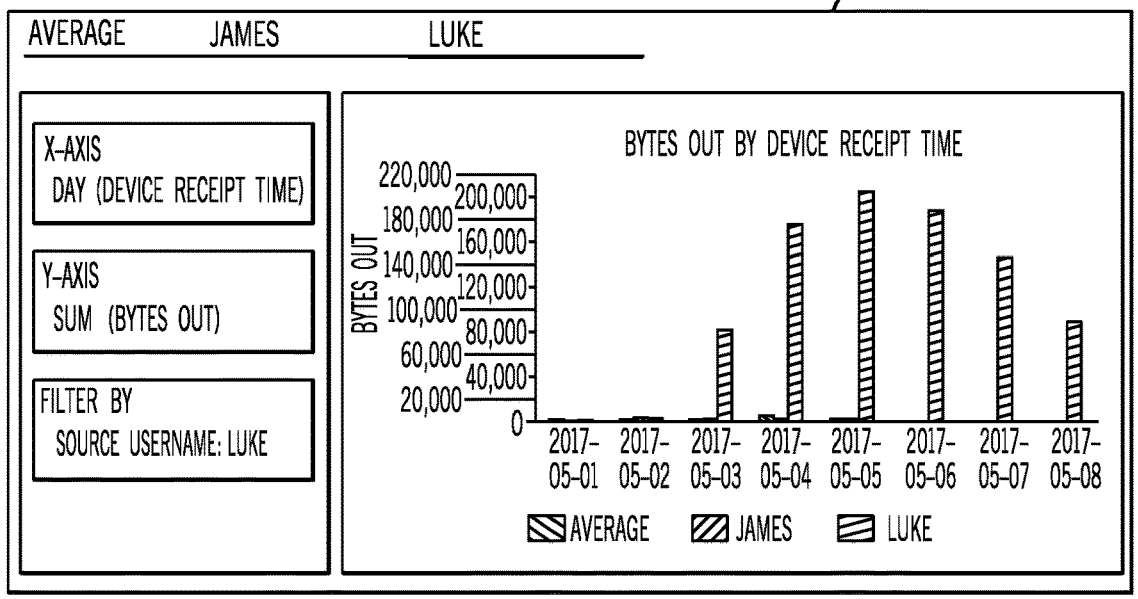
Figure 4H:
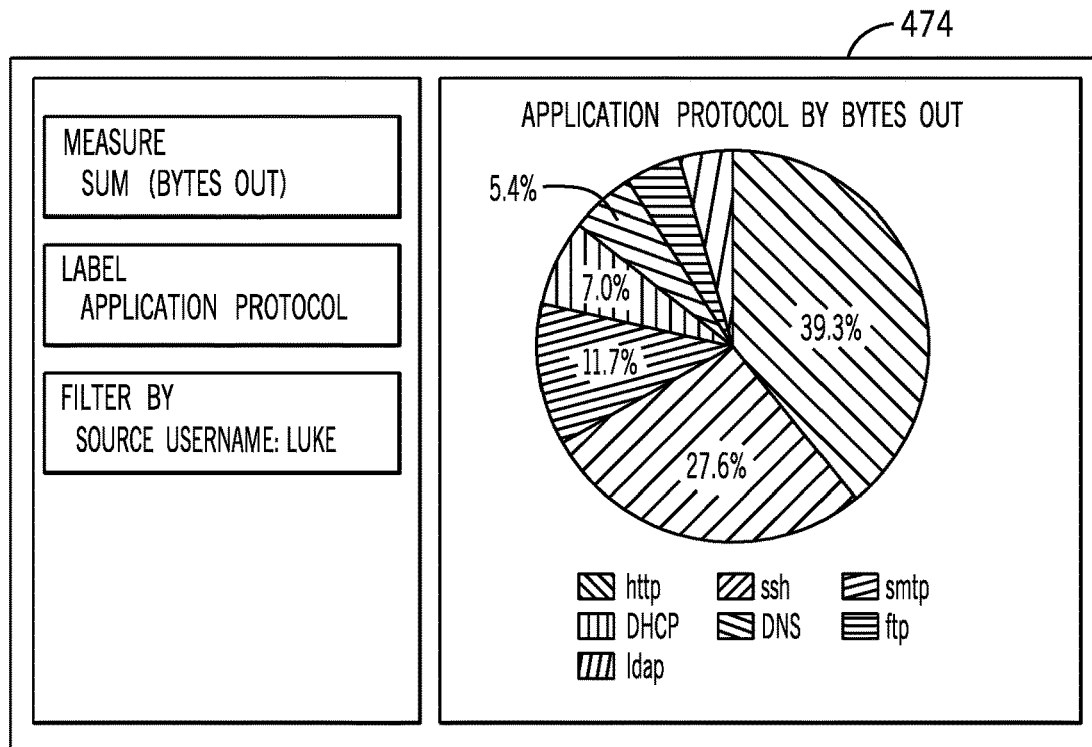
Figure 4I:
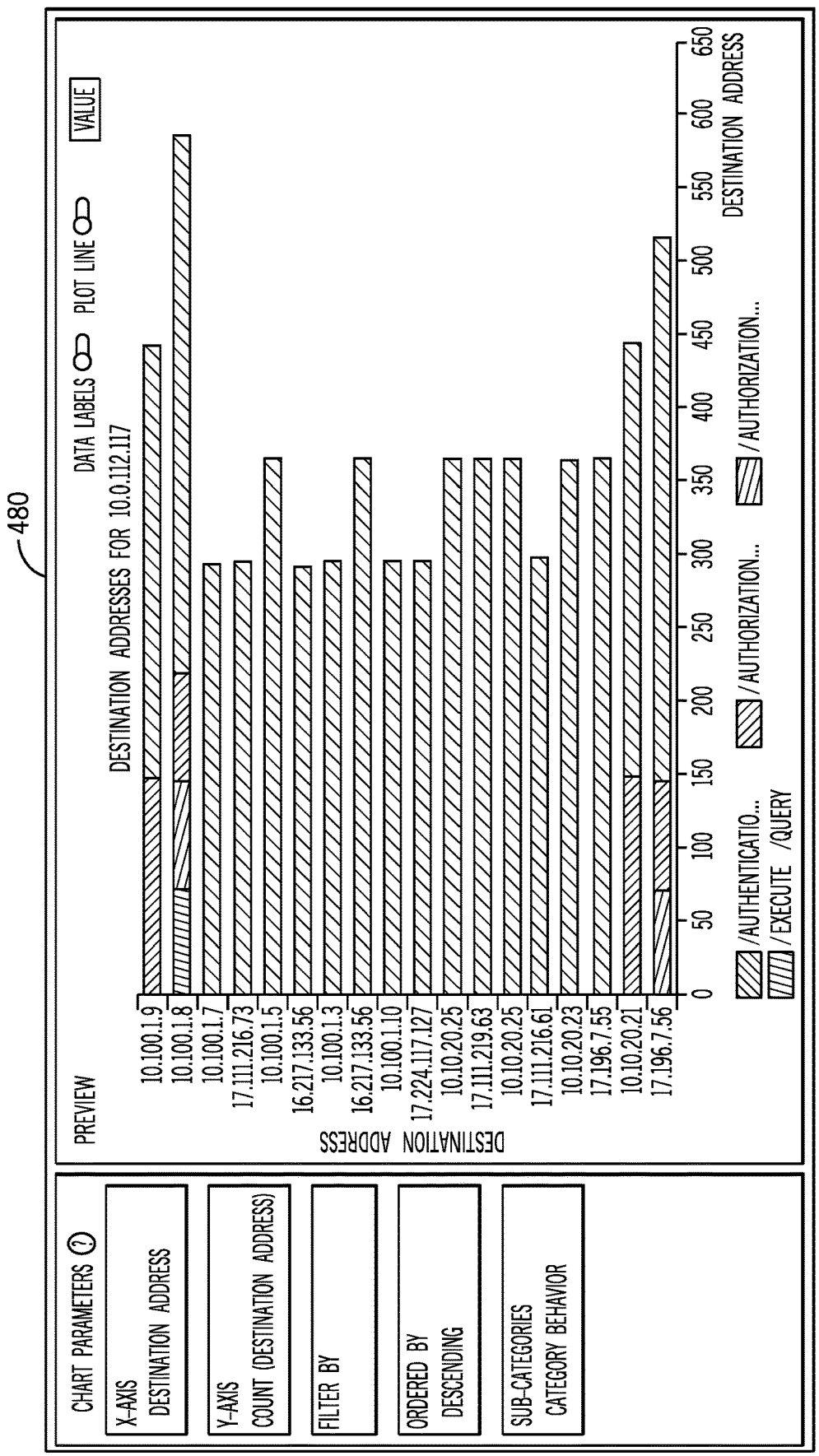

Next, referring to FIG. 4F, the supervised machine learning training engine may recommend a multi-chart 460, i.e., a recommendation that the security analyst check the outbound traffic for each of the users who are using the infected hosts for purposes of determining whether there is a compromised account through which data was exfiltrated. For that, the supervised machine learning training engine 130 recommends such parameters as a day granularity 462, and a vertical axis 464 that corresponds to the bytes out.

As depicted in FIG. 4F, a bar chart is recommended with a defined axis and filter. The security analyst 117 may change the definitions (for example, from average traffic for a baseline to a summation of traffic for each user). Moreover, the security analyst 117 may expand the time range to see more than the last day. For the specific example of FIG. 4E, a time range of seven days is selected. Moreover, as depicted in FIG. 4E, the visualization shows that Luke's account has anomalous outbound traffic. Therefore, his account may be compromised.

For purposes of confirming the compromised account and the corresponding data exfiltration, the supervised machine learning engine 130 may next recommend that the security analyst 117 look at the specific type of traffic. In this manner, referring to FIG. 4G, the supervised machine learning engine may recommend a pie chart 470 and define the corresponding axis and filters. As depicted by the pie chart 470, a relatively high volume of Secure SHell (SSH) traffic out of the suspicious account reinforces the suspicion that Luke's account is compromised and data has been exfiltrated.

In accordance with example implementations, the supervised machine learning engine 130 may next suggest that the security analyst 117 look for lateral movement, i.e., whether the malware has managed to spread, or propagated, and infect other hosts 180 (FIG. 1) of the computer system 100. As such, in the screenshot 480 of FIG. 4I, the supervised machine learning engine 130 may suggest through the GUI 116 a chart type and its definitions that would best suit this purpose. From the results of the corresponding histogram chart, it may be learned that the malware tried to infect other hosts, and it seems that one of these hosts might have been breached.

Figure 4J:
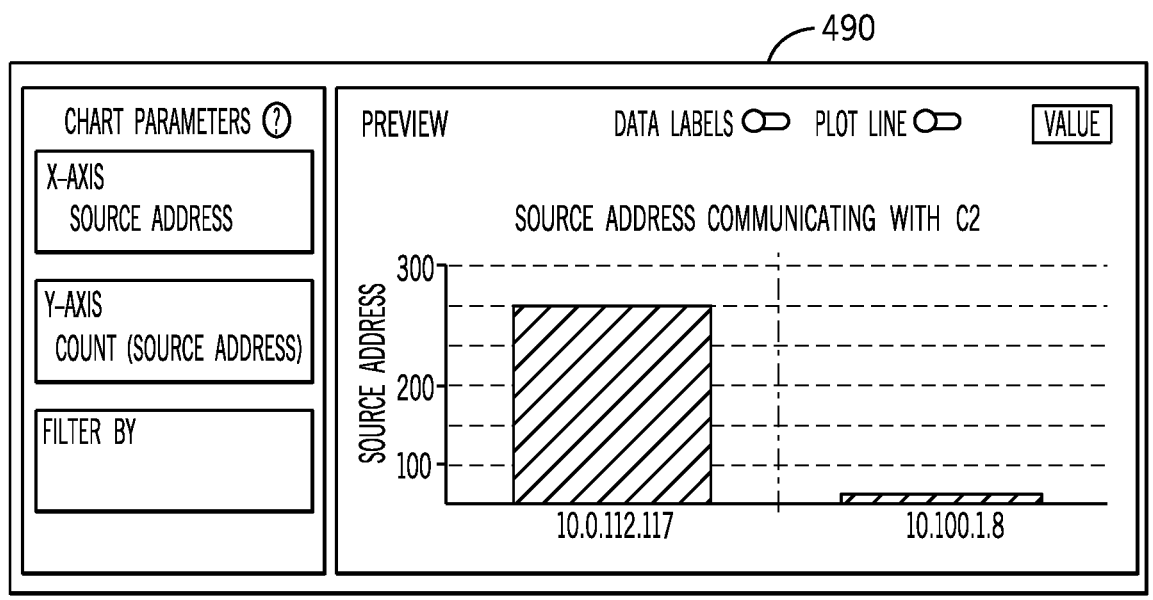

Referring to FIG. 4J, the supervised machine learning engine 130 may next suggest a visualization to validate the suspicion of whether another host has been laterally infected and conclude the investigation. In this manner, FIG. 4J depicts a recommended chart 490 by the supervised machine learning engine 130 to allow the security analyst 117 to check whether hosts are communicating with the attacker command and control server (i.e., the website3.com domain for this example). From this visualization, the security analyst 117 may see the host, which was reported in the alert that started the investigation, but as also depicted in FIG. 4J, the security analyst may identify from the visualization another host (IP address 10.100.1.8), which seems to have been successfully compromised by the lateral movement of the malware, as the visualization reveals that this other host has started to communicate with the attacker command and control server. The security analyst identified the attacker command and control server (website3.com), detected a compromised account (Luke), detected lateral movement, detected an additional compromised host, found an indication of data exfiltrations and established the attack timeline.

It is noted that although a specific example of an investigation prompted by a security alert is described herein, the supervised machine learning engine 130 may be used, in accordance with further example implementations, to perform an investigation that hunts for threats by working with, for example, indicators of compromise (IOCs). In general, hunting for threats is the art of analyzing data based on a hypothesis, as opposed to starting from a specific security alert, as described above. For example, a security analyst may have a blacklist containing a list of known malicious IP addresses. The security analyst 117 may begin the hunting investigation by searching if any of the internal hosts of an organization have communicated with the malicious IPs of the blacklist over the last seven days. As an example, in this investigation, the security analyst 117 may find a relatively large number of events (30,000, for example) that met the search query.

The supervised machine learning engine 130 may, for example, select the next step by recommending a line chart, with two different series: one series that shows the number of communications from each internal host to any of the malicious IP addresses, and a second series of a number of unique malicious IP addresses that each host has been communicating with. These two series, in turn, may aid the security analyst in determining which hosts are suspicious and might be compromised. It is noted that each of these series might or may point to different hosts.

The supervised machine learning engine 130 may then suggest additional steps to guide the hunting investigation. For example, the security analyst 117 may look for antivirus activity on each of the hosts trying to see if the host may have been affected by a virus or malware recently, using a different chart with different definitions. The security analyst may need to change the query and time range for this search.

A hunting investigation, similar to an alert-prompted investigation, has a starting point from which the supervised machine learning engine 130 may learn and model so that the engine may guide for similar hunting investigations. For example, now that the analyst has a black list for malicious domains, the supervised machine learning engine 130 knows the investigation steps are identical to malicious IP addresses hunting investigations and suggests the next steps in their definitions. Moreover, a security analyst that has never performed hunting based on blacklists may now be provided with detailed guidance on how to conduct his first blacklist-based hunting investigation. Similar to alert-prompted investigations where there are multiple types of threats and alerts, a hunting investigation also has multiple scenarios that may be modeled for guided investigation by the supervised machine learning engine.

Figure 5:
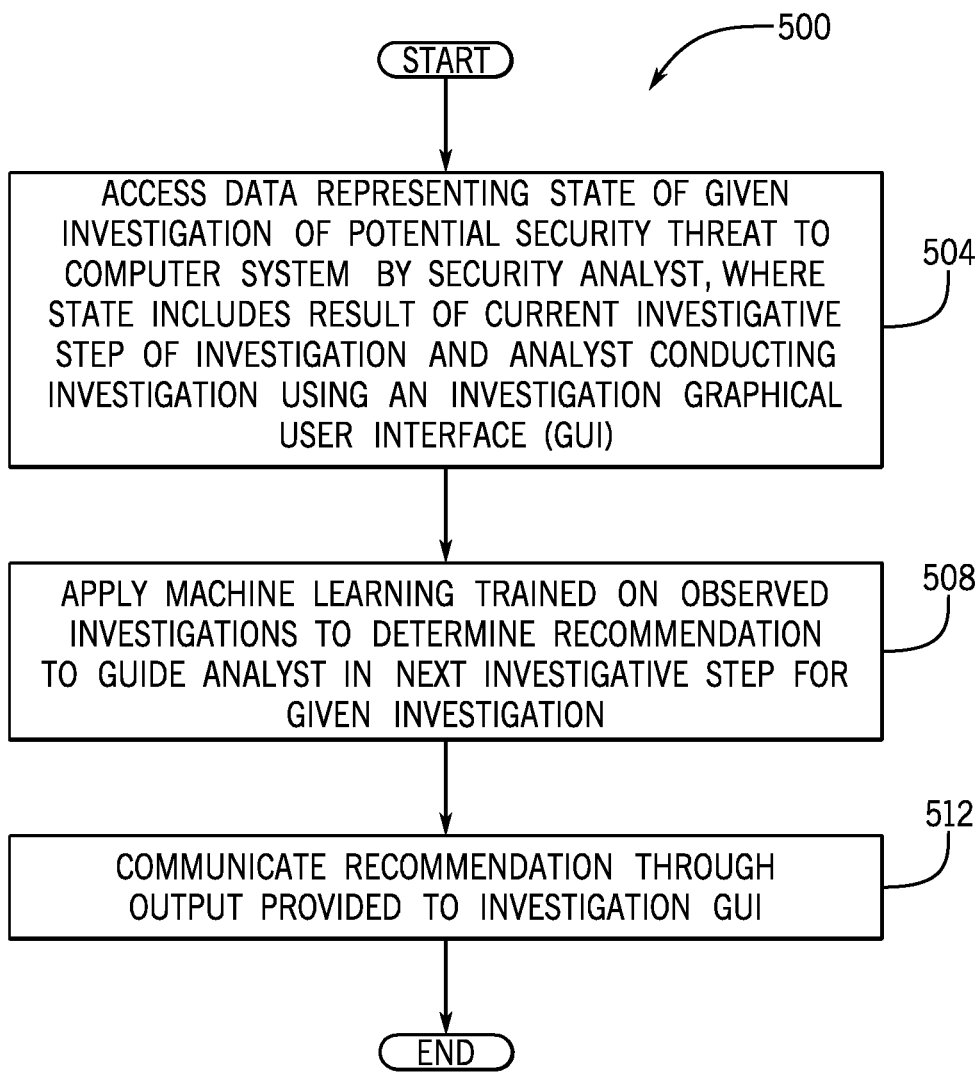
FIG. 5 is a flow diagram depicting a technique to determine a recommendation to guide a security threat investigation according to an example implementation.

Thus, in accordance with example implementations, the supervised machine learning engine 130 of FIG. 1 may perform a technique 500 that is illustrated in FIG. 5. Referring to FIG. 5 in conjunction with FIG. 1, the technique 500 includes accessing data (block 504) representing a state of a given investigation of a potential security threat to a computer system by a security analyst. The state includes a result of a current investigative step of the investigation, and the analyst conducts the investigation using an investigation graphical user interface (GUI). Pursuant to block 508, the technique 500 includes applying machine learning that is trained on observed investigations to determine a recommendation to guide the analyst in the next investigative step for the given investigation. The technique 500 includes communicating (block 512) the recommendation through output that is provided to the investigation GUI.

Figure 6:
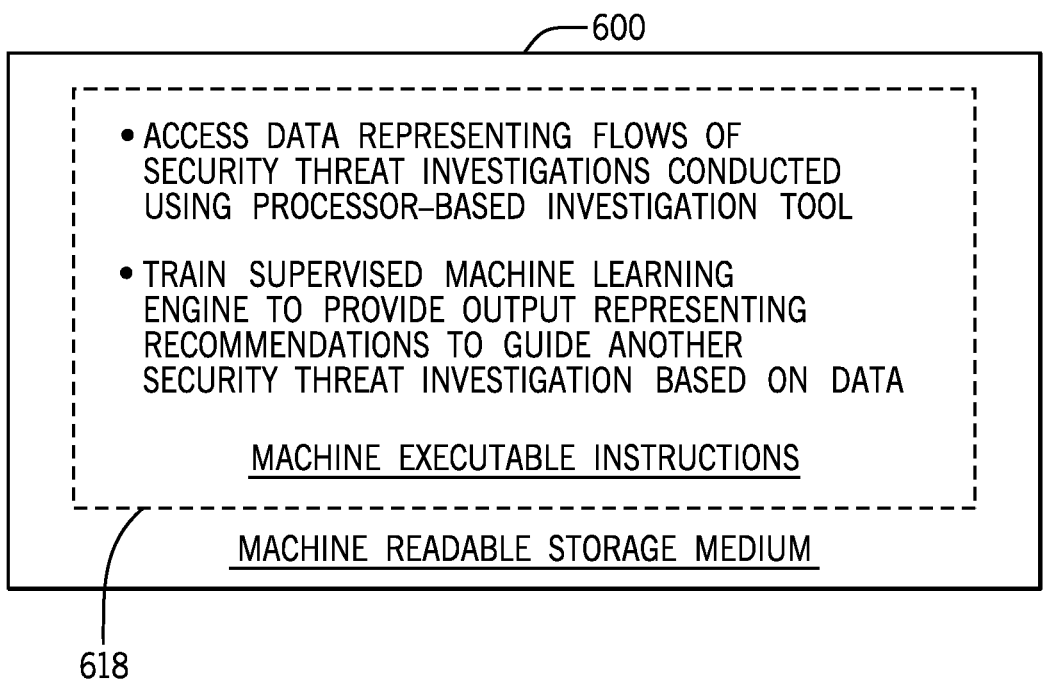
FIG. 6 is an illustration of machine executable instructions stored on a non-transitory machine readable storage medium to train a supervised machine learning engine to provide recommendations to guide a security threat investigation according to an example implementation.

Referring to FIG. 6, in accordance with example implementations, a non-transitory machine readable storage medium 600 stores machine executable instructions 618 that, when executed by a machine, cause the machine to access data that represents flows of security threat investigations that are conducted using a processor-based investigation tool. The instructions, when executed by the machine, cause the machine to train a supervised machine learning engine to provide an output that represents recommendations to guide another security threat investigation based on the data.

Figure 7:
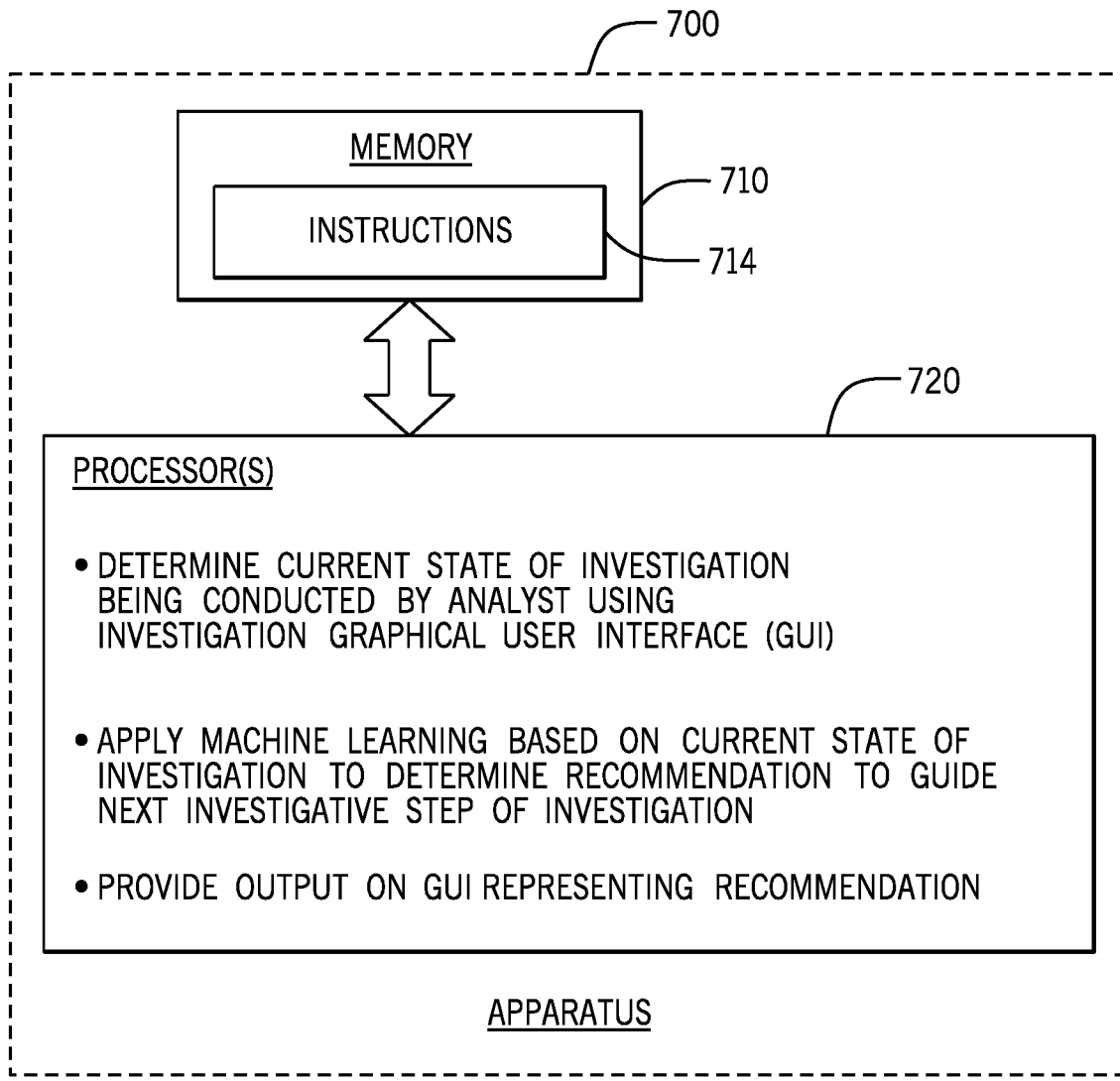
FIG. 7 is a schematic diagram of an apparatus to determine and provide a recommendation to guide a security threat investigation being conducted on an investigation GUI according to an example implementation.

Referring to FIG. 7, in accordance with example implementations, an apparatus 700 includes at least one processor 720 and a storage medium, such as a memory 710. The memory 710 stores instructions 714 that, when executed by the processor(s) 720, cause the processor(s) 720 to determine a current state of an investigation being conducted by an analyst using an investigation graphical user interface (GUI); and apply machine learning based on a current state of the investigation to determine a recommendation to guide the next investigative step of the investigation. The instructions 714, when executed by the processor(s) 720, cause the processor(s) 720 to provide output on the GUI representing the recommendation.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
   accessing data representing a state of an investigation, wherein:
   the investigation is associated with a security analyst and a potential security threat to a computer system,
   the data representing the state of the investigation comprises a result of an investigative step performed during the investigation, and
   the result of the investigative step performed during the investigation comprises one or more of a host internet protocol associated with the investigation, a step taken by the security analyst, a query submitted in the investigation, a comparative analysis performed by the security analyst, data gathered during the investigation, a timeline considered by the security analyst, a filtering parameter used by the security analyst, and a field set considered by the security analyst;
   applying the result of the investigative step performed during the investigation as an input to a machine learning engine trained on observed investigations;
   processing, with the machine learning engine, the result of the investigative step performed during the investigation;
   generating, with the machine learning engine, a recommendation based on the result of the investigative step performed during the investigation, wherein the recommendation comprises a next investigative step of the investigation;
   displaying the recommendation comprising the next investigative step of the investigation on a graphical user interface (GUI) associated with the security analyst; and
   training the machine learning engine based on an action taken by the security analyst in response to the recommendation, wherein training the machine learning engine based on the action taken by the security analyst comprises training the machine learning engine based on whether the recommendation was accepted or rejected.

2. The method of claim 1, wherein processing the result of the investigative step performed during the investigation using the machine learning engine comprises determining a next action to be taken by the security analyst in the investigation.

3. The method of claim 1, wherein processing the result of the investigative step performed during the investigation using the machine learning engine comprises determining a timeline for a chart displayed on the GUI.

4. The method of claim 1, wherein processing the result of the investigative step performed during the investigation using the machine learning engine comprises determining a type of chart to be displayed on the GUI.

5. The method of claim 1, wherein processing the result of the investigative step performed during the investigation using the machine learning engine comprises determining a layout parameter of a chart to be displayed on the GUI.

6. The method of claim 1, wherein processing the result of the investigative step performed during the investigation using the machine learning engine comprises determining, for a query to be submitted in the investigation, one or more of: an internet protocol (IP) address associated with the query to be submitted in the investigation, a time line associated with the query to be submitted in the investigation, filter criteria associated with the query to be submitted in the investigation, a host name associated with the query to be submitted in the investigation, and a user name associated with the query to be submitted in the investigation.

7. The method of claim 1, further comprising:
   displaying an option to accept or reject the recommendation on the GUI; and
   automatically configuring the GUI based on the recommendation in response to a response received from the security analyst indicating acceptance of the recommendation.

8. The method of claim 1, wherein training the machine learning engine based on the action taken by the security analyst comprises training the machine learning engine based on the security analyst modifying the recommendation.

9. A non-transitory machine-readable storage medium storing instructions that, when executed by a machine, cause the machine to:
- access data representing a state of an investigation, wherein:
  - the investigation is associated with a security analyst and a potential security threat to a computer system,
  - the data representing the state of the investigation comprises a result of an investigative step performed during the investigation, and
  - the result of the investigative step performed during the investigation comprises one or more of a host internet protocol associated with the investigation, a step taken by the security analyst, a query submitted in the investigation, a comparative analysis performed by the security analyst, data gathered during the investigation, a timeline considered by the security analyst, a filtering parameter used by the security analyst, and a field set considered by the security analyst;
- apply the result of the investigative step performed during the investigation as an input to a machine learning engine trained on observed investigations;
- process, with the machine learning engine, the result of the investigative step performed during the investigation;
- generate, with the machine learning engine, a recommendation based on the result of the investigative step performed during the investigation, wherein the recommendation comprises a next investigative step for the investigation;
- display the recommendation comprising the next investigative step of the investigation on a graphical user interface (GUI) associated with the security analyst; and
- train the machine learning engine based on an action taken by the security analyst in response to the recommendation, wherein train the machine learning engine based on the action taken by the security analyst comprises training the machine learning engine based on whether the recommendation was accepted or rejected.

10. The storage medium of claim 9, wherein the instructions, when executed by the machine, further cause the machine to train the machine learning engine to recommend a query for the next investigative step of the investigation.

11. The storage medium of claim 9, wherein processing the result of the investigative step performed during the investigation using the machine learning engine comprises determining a next action to be taken by the security analyst in the investigation.

12. The storage medium of claim 9, wherein processing the result of the investigative step performed during the investigation using the machine learning engine comprises determining a timeline for a chart displayed on the GUI.

13. The storage medium of claim 9, wherein processing the result of the investigative step performed during the investigation using the machine learning engine comprises determining a type of chart to be displayed on the GUI.

14. A first computer system comprising:
- at least one processor; and
- a storage medium storing instructions that, when executed by the at least one processor, cause the at least one processor to:
  - access data representing a state of an investigation, wherein:
    - the investigation is associated with a security analyst and a potential security threat to a second computer system,
    - the data representing the state of the investigation comprises a result of an investigative step performed during the investigation, and
    - the result of the investigative step comprises one or more of a host internet protocol associated with the investigation, a step taken by the security analyst, a query submitted in the investigation, a comparative analysis performed by the security analyst, data gathered during the investigation, a timeline considered by the security analyst, a filtering parameter used by the security analyst, and a field set considered by the security analyst;
  - apply the result of the investigative step performed during the investigation as an input to a machine learning engine trained on observed investigations;
  - process, with the machine learning engine, the result of the investigative step performed during the investigation;
  - generate, with the machine learning engine, a recommendation based on the result of the investigative step performed during the investigation, wherein the recommendation comprises a next investigative step of the investigation;
  - display the recommendation comprising the next investigative step of the investigation on a graphical user interface (GUI) associated with the security analyst; and
  - train the machine learning engine based on an action taken by the security analyst in response to the recommendation, wherein train the machine learning engine based on the action taken by the security analyst comprises training the machine learning engine based on whether the recommendation was accepted or rejected.

15. The first computer system of claim 14, wherein the instructions, when executed by the at least one processor, further cause the at least one processor to train the machine learning engine based on modification of the recommendation by the security analyst.

16. The first computer system of claim 14, wherein the instructions, when executed by the at least one processor, further cause the at least one processor to train the machine learning engine based on an observed analyst response to the recommendation.

17. The first computer system of claim 14, wherein displaying the recommendation comprises displaying a chart visualization.

18. The first computer system of claim 14, wherein processing the result of the investigative step performed during the investigation using the machine learning engine comprises determining a next action to be taken by the security analyst in the investigation.

* * * * *